United States Patent [19]

Campbell et al.

[11] Patent Number: 5,789,061
[45] Date of Patent: Aug. 4, 1998

[54] STIFFENER REINFORCED ASSEMBLY AND METHOD OF MANUFACTURING SAME

[75] Inventors: Thomas G. Campbell, Concord; John J. Harris, Northboro; Thomas M. Fusco, Medford; Sara E. Rosenberg, Waltham; Glenn A. Freitas, Foxboro; Eric J. Blaney, Maynard, all of Mass.

[73] Assignee: Foster-Miller, Inc., Waltham, Mass.

[21] Appl. No.: 886,592

[22] Filed: Jul. 1, 1997

Related U.S. Application Data

[63] Continuation-in-part of Ser. No. 600,473, Feb. 13, 1996, Pat. No. 5,589,015.

[51] Int. Cl.⁶ .................................................. B32B 3/26
[52] U.S. Cl. .................. 428/119; 428/223; 428/317.9; 428/319.1; 156/73.1; 156/92
[58] Field of Search .................................. 428/119, 223, 428/301.4, 317.9, 319.1; 52/630, 631; 156/73.1, 92

[56] References Cited

U.S. PATENT DOCUMENTS

| | | | |
|---|---|---|---|
| 3,184,353 | 5/1965 | Balamuth et al. | 156/92 X |
| 3,440,117 | 4/1969 | Soloff et al. | 156/92 X |
| 4,808,461 | 2/1989 | Boyce et al. | 428/119 |
| 5,021,107 | 6/1991 | Holko | 156/89 |
| 5,186,776 | 2/1993 | Boyce et al. | 156/73.2 |
| 5,466,506 | 11/1995 | Freitas et al. | 428/105 |
| 5,589,015 | 12/1996 | Fusco et al. | 156/73.1 |
| 5,667,859 | 9/1997 | Boyce et al. | 428/59 |

*Primary Examiner*—James Sells
*Attorney, Agent, or Firm*—Iandiorio & Teska

[57] ABSTRACT

An improved stiffener reinforced assembly and method. There is a skin member and a stiffener member including a web portion, a flange portion, and a radius region interconnecting the web portion and the flange portion. The flange portion resides on the skin member. A plurality of reinforcing pins are disposed through the radius region of the stiffener member and into the skin member to secure the stiffener member to the skin member.

12 Claims, 4 Drawing Sheets

STIFFENER REINFORCED ASSEMBLY AND METHOD OF MANUFACTURING SAME

RELATED APPLICATIONS

This application is a continuation-in-part application of U.S. patent application Ser. No. 08/600,473 entitled METHOD AND SYSTEM FOR INSERTING REINFORCING ELEMENTS IN A COMPOSITE STRUCTURE filed on Feb. 13, 1996, U.S. Pat. No. 5,589,015.

FIELD OF INVENTION

This invention relates to an improved stiffener reinforced assembly in which reinforcing pins are inserted through the stiffener at the radius region of the stiffener and into the skin material to increase the initial failure load of the joint between the stiffener and the skin material.

BACKGROUND OF INVENTION

Composite materials comprising laminated plies of fabric in a resin matrix are used because of their high strength to weight ratio. Fastening two composite parts together, however, is often troublesome. For example, when one composite part is attached to another composite part, bolts and/or rivets may be used, but such fasteners add weight, increase fabrication cost, and often contribute to local failure modes between the individual plies of the laminate composite.

Composite aircraft stiffeners are used to reinforce thin composite structures such as wing and fuselage skins and bulkhead webs. The stiffener attachments must transfer shear loads from the skin to the stiffener, as well as out-of-plain loads due to peel (delamination) forces and frame attachments. The stiffener flange is generally tapered in thickness to minimize stress concentrations and to transfer loads from the stiffener to the skin material. The current practice is to either co-cure, adhesively bond, or mechanically fasten the stiffener to the skin. The co-curing and adhesive bonding techniques offer the minimum weight solution. However, the reliability of co-cured and adhesive bonded joints is generally low. Mechanically fastened joints (e.g. bolts and rivets) have been successfully used, but the use of mechanical joints require that the laminate be reinforced so that it can react to bolt bearing loads. Additionally, the fasteners themselves are very heavy and expensive and the cost of installation and inspection results in a high cost per fastener.

SUMMARY OF INVENTION

It is therefore an object of this invention to provide an improved composite stiffener reinforced assembly.

It is a further object of this invention to provide an improved method of securing a stiffener member to a skin member.

It is a further object of this invention to provide such a method which is superior to co-curing and adhesive bonding techniques.

It is a further object of this invention to provide such a method which does not increase the weight and cost of joining a stiffener member to a skin member.

It is a further object of this invention to provide a high reliability stiffener reinforced assembly.

It is a further object of this invention to provide such an improved stiffener reinforced assembly with a higher failure load capacity.

It is a further object of this invention to provide such an improved stiffener reinforced assembly which resists crack propagation at the joint region between the stiffener and the skin material to which it is attached.

This invention results from the realization that a composite stiffener can be more efficiently and more securely attached to a composite skin material by inserting reinforcing pins at the radius region of the stiffener and into the skin material to increase the initial failure load of the joint between the stiffener and the skin material and also by inserting reinforcing pins through the flange portion of the stiffener and into the skin material to resist crack propagation. In addition, the pins reinforce the individual plies of both the stiffener and the skin material to resist delamination. The pins may be inserted when the stiffener and/or the skin material are in the prepreg stage and then the whole assembly can be co-cured to form a very strong stiffener reinforced assembly. The pins may be first disposed in a foam body and then inserted through the stiffener and into the skin material using an ultrasonic horn brought to bear down on the foam body/pin combination. The foam body maintains the proper orientation of the pins during the insertion process and allows a number of pins to be inserted simultaneously.

This invention features an improved stiffener reinforced assembly. There is a skin member; a stiffener member including a web portion, a flange portion, and a radius region interconnecting the web portion and the flange portion. The flange portion resides on the skin member. There are a plurality of reinforcing pins disposed through the radius region of the stiffener member and into the skin member to secure the stiffener member to the skin member. In a preferred embodiment, there are also a plurality of reinforcing pins disposed through the flange portion or portions of the stiffener member and into the skin member. A plurality of pins may also be disposed through the web portion of the stiffener member.

Some stiffener members include a noodle region with a stiffener noodle disposed therein. This invention also features a softener layer disposed within the noodle region about the radius region.

One particular stiffener member includes two pieces of material, each piece comprising one half of the web portion and each piece terminating in a flange portion. The flange portions reside on the skin member. There are a plurality of reinforcing pins disposed through the radius region of the stiffener member and into the skin member to secure the stiffener member to the skin member. There are also a plurality of reinforcing pins disposed through the flange portions of the stiffener member and into the skin member and a plurality of pins disposed through the web portion of the stiffener member.

This invention also features a method of securing a stiffener member including a web portion, flange portion, and a radius region to a skin member. The method includes disposing the flange portion or portions of the stiffener member on the skin member; and inserting a plurality of reinforcing pins through the stiffener member at the radius region of the stiffener member and into the skin member. The step of inserting includes: placing a number of the pins in a compressible material, placing the compressible material/pin combination about the radius region of the stiffener member, imparting ultrasonic energy to the pins, and simultaneously applying pressure to the compressible material to compress the same and insert the pins through the stiffener member and into the skin member.

The stiffener member may initially be a prepreg composite material and the reinforcing pins are inserted through the prepeg material before the prepreg material is cured. The skin material may also be a prepreg composite material which is co-cured with the stiffener member after the reinforcing pins are inserted.

The method further includes the step of inserting a plurality of reinforcing pins through the flange portion of the stiffener member and into the skin member and the additional step of inserting a plurality of pins through the web portion of the stiffener member. If the stiffener member includes a noodle region, the method further includes the step of disposing a stiffener noodle within the noodle region and preferably includes the step of adding a softening layer within the noodle region about the radius region.

This invention also features a unique method of forming a stiffener. First and second composite members are assembled, the first and second composite members are bent into J-shapes defining opposing flange portions, a web portion, and radius region between the flange portions and the web portion, and the web portions of each member are joined to each other. Then, the flange portions are placed on a skin member and a plurality of reinforcing pins are inserted into the formed stiffener through the radius region and into the skin member. Joining preferably includes disposing a plurality of reinforcing pins through one member and into the other member at the web portion. The method also includes the step of disposing a plurality of reinforcing pins through the flange portions of the stiffener and into the skin member.

DISCLOSURE OF PREFERRED EMBODIMENT

Figure 1:
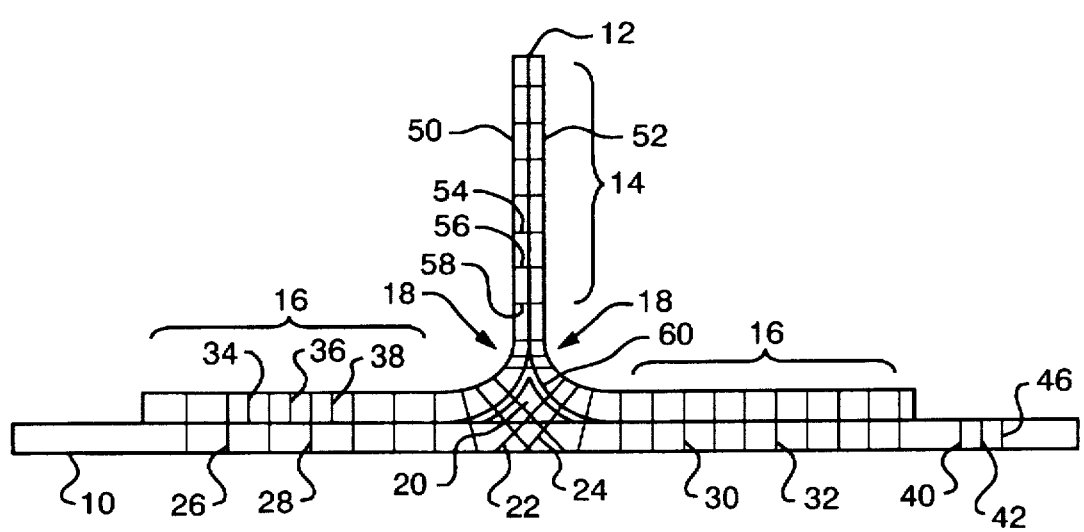
FIG. 1 is a schematic cross-sectional diagram of the improved stiffener reinforced assembly of this invention.

FIG. 1 shows stiffener 12 attached to skin member 10 in accordance with this invention. Stiffener member 12 and skin member 10 are typically composite components made up of individual plies of fabric reinforced by a resin matrix as is known in the composite arts. Stiffener member 12 includes web portion 14 and flange portions 16. It can be seen that flange portions 16 reside on skin member 10. Between web portion 14 and flange portion 16 is radius region 18. Area 20 is called the "noodle region" which is typically filled with a "stiffener noodle" (not shown) made of a fiber rope impregnated with resin.

In the prior art, flange portion 16 is attached to skin member 10 by the use of bolts, rivets, adhesives, or a co-curing process. In contrast, in this invention, discrete reinforcing pins 22, 24, and the like are disposed through radius region 18 of stiffener member 12, through the stiffener noodle, and into skin member 10 to secure stiffener member 12 to skin member 10 at the critical radius region 18. Additional reinforcing pins 26, 28, 30, 32 and the like are disposed through flange portions 16 of stiffener member 12 and into skin member 10 as shown to resist crack propagation at the joint region between stiffener member 12 and skin member 10. Pins 22 and 24 at radius region 18 act to increase the initial failure load of the joint between the stiffener member and the skin member and pins 26–32 act to resist crack propagation along the joint between the stiffener member and the skin member.

Each member 10 and 12 may also be individually reinforced as shown by reinforcing pins 34, 36, and 38 for stiffener member 12; and reinforcing pins 40, 42, and 46 for skin member 10. See U.S. Pat. No. 4,808,461, incorporated herein by this reference.

Stiffener member 12, FIG. 1, may comprise two pieces of composite material 50 and 52 each making up one half of web portion 14 as shown. Members 50 and 52 are bent into i-shapes and placed back to back defining web portion 14 and flange portions 16. Reinforcing pins 54, 56, and 58 as shown secure members 50 and 52 to each other thus forming stiffener web portion 14. Pins 54, 56, and 58 also provide a resistance to crack propagation in web portion 14 for cracks which initiate in radius region 18 and ordinarily might propogate both into web portion 14 and flange portion 16.

In addition to a stiffener noodle within noodle region 20, this invention features softening layers 60 disposed within noodle region 20 about radius region 18. Softening layer 60 may be rubber, urethane materials, or other softening materials that are bondable to the radius and noodle materials. The softening layer decreases the resistance of radius region 18 to translation radially thus increasing the load carried by the pins and also increasing the strain-to-failure of the radius bond to the noodle. Softening layers 60 also softens the stress concentration.

Reinforcing pins 22, 24, 26, 28, 30, 32, 34, 36, 38, 40, 42, and 46 may be carbon or titanium. Stiffener member 12 and skin member 10 may be a fiber matrix structure formed of plies of fiber in a cured resin matrix, plies of fiber in an uncured resin matrix combined as a prepreg, a preform material of fibrous material and a tackifier, or even raw fiber matting which has yet to be impregnated with resin. The resin used to secure the individual plies of the fiber matrix structure may be epoxy, polymides, bismaleimides, phenolics, polycyanurate, PEEK, polyetherkeytone, PPS, polyphenolsulfide, avamid, polymides, polyester, vinylesthers and any resin that can be made into a composite including ceramic, carbon and metal matrix composites.

Figure 2:
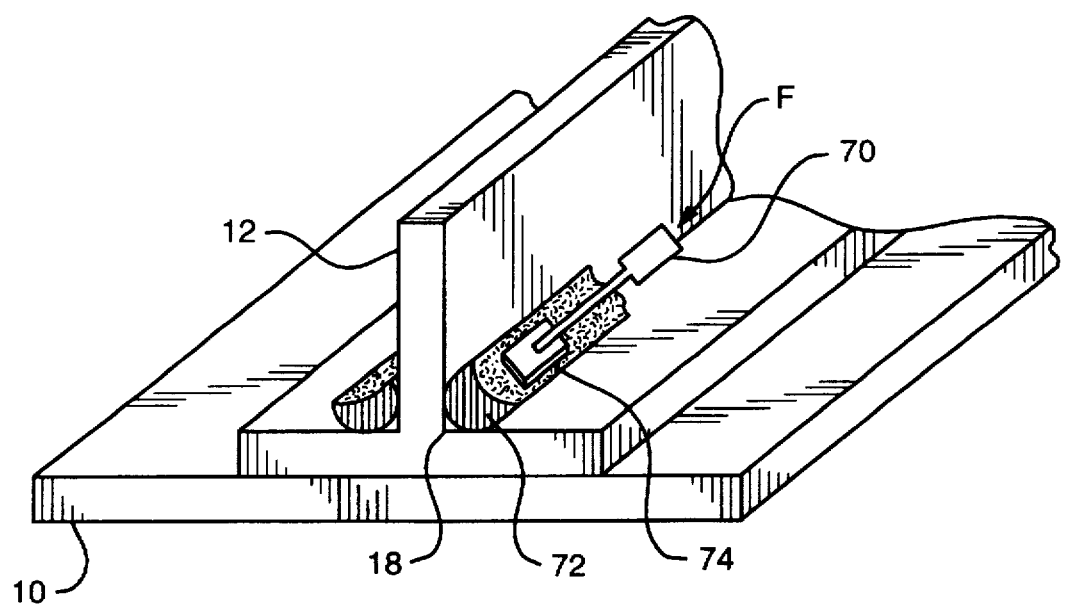
FIG. 2 is a schematic three-dimensional view depicting the preferred embodiment of inserting the reinforcing pins through the radius region of the stiffener and into the skin member.
Figure 3:
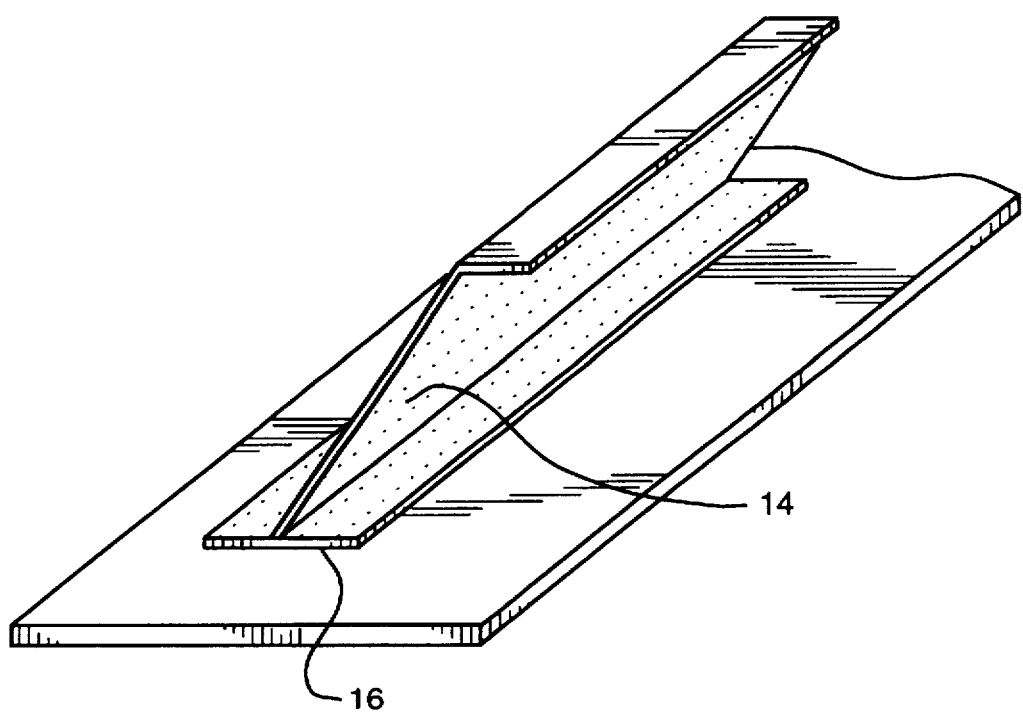
FIG. 3 is a schematic three-dimensional view of a particular type of stiffener secured to a skin member in accordance with this invention.

The pins are preferably inserted as shown in FIG. 2 by the use of ultrasonic transducer 70. A number of such pins are first disposed in compatible body 72 which is formed to match the curvature of radius region 18. Ultrasonic transducer 70 is then used to impart ultrasonic energy to the pins while at the same time pressure, as depicted by force vector F, is applied to compress body 72 and to drive the pins through the radius region 18 and into skin member 10. Body 72 conveniently maintains the pins in their proper orientation during the step of applying ultrasonic energy and pressure. The use of ultrasonic energy also causes localized melting about the pins which further facilitates a strong bond between stiffener 12 and skin member 10. A similar method is used to insert the pins through the flange portion 16 and web portion 14 as shown in FIGS. 1 and 3.

Body 72, FIG. 2, may be a substance compressible under pressure including an elastomeric material such as RTV silicon rubber, FIBER FORMT™ graphite insulation, KAWOOL™ ceramic insulation, phenolic based foam, fiber glass, and polyamide based insulation, melamine, Rohacell™, Polymathacrylimidetm, Diveneycell™, cross linked polyvinyl, Klegecell™ based rigid polyvinyl chlorides, foams, PVC (polyvinyl chloride), polyesters, polyethylene, polypropolenes, polyurethanes, polystyrenes, polymides, cellulose, acetates, silicones, polybenzimidalozes, polyvinyls, PEEK, polyetherkeytone, PPS, polyphelonllynesulfide, carbon, and graphite. Body 72 may also be impregnated with a resin to urge resin into the pin holes when the pins are inserted to further strengthen the pin reinforced plies of the composite fabric.

In the laboratory, ultrasonic transducer 70, FIG. 2, was a model TW2 available from Branson powered by model E150 Branson Power Supply. Ultrasonic transducer 70 was placed in a drill press over foam body 72 after a length of tape was used to secure the foam body/pin combination about radius region 18. The ultrasonic transducer was then energized to a frequency of 20 KHz and brought to bear down on the foam body using the drill press with an applied force estimated to be about 20–30 lbs. The area of transducer tip 74 was modified to be 0.5 by 0.435 inches long in order to insert about 4 pins at a time. The power and weld times can be varied to suit the specific application. In the laboratory, it was found that 75% power and a 2.0 second weld time resulted in adequate performance in inserting stainless steel or similar pins through composite preforms and even cured composite components. An array of pins each about 0.1 mm in diameter, were disposed in foam body 72 with a space between the pins of about 1.5 mm. The diameter, length, and spacing in the pins will depend on the geometry of the composite stiffener member 12 to be attached to skin member 10.

Figure 4:
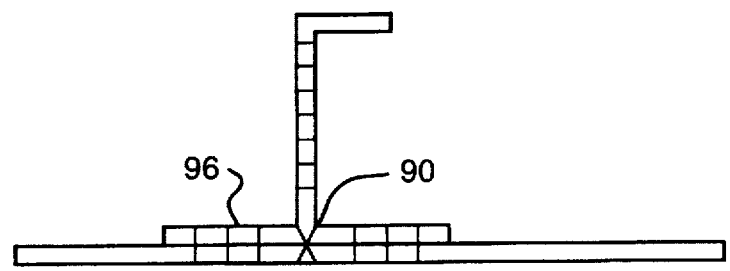
FIG. 4 is a schematic cross-sectional diagram of another type of stiffener member secured to a skin member in accordance with this invention.
Figure 5:
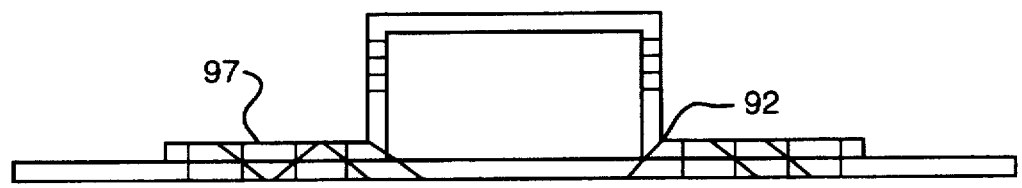
FIG. 5 is a schematic cross-sectional view of another type of stiffener member secured to a skin material in accordance with this invention.
Figure 6:
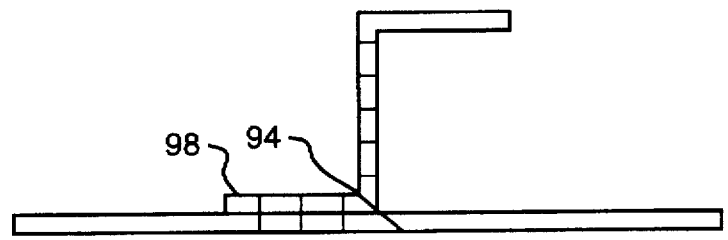
FIG. 6 is a schematic cross-sectional view of still another type of stiffener attached to a composite skin member in accordance with this invention.

Other designs for stiffener members used in this invention are shown in FIGS. 4–6. In each design, a plurality of pins are inserted through the stiffener member at the radius region 90, FIG. 4; 92, FIG. 5; and 94, FIG. 6, and also preferably through the flange portion of the stiffener as shown at 96, FIG. 4; 97, FIG. 5; and 98, FIG. 6. The pins may be inserted when the stiffener and the skin material are at the prepreg stage. The two joined prepreg components can then be co-cured. The pins may also be inserted into cured components with an adhesive layer between them to form a strong joint.

Thirty percent increases in the initial failure load have been demonstrated with the design shown in FIG. 1 due to the reinforcing pins inserted at the radius region of the stiffener.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An improved stiffener reinforced assembly comprising:
   a skin member;
   a stiffener member including a web portion, a flange portion, and a radius region interconnecting the web portion and the flange portion, the flange portion residing on the skin member; and
   a plurality of discrete reinforcing pins disposed through the radius region of the stiffener member and into the skin member to secure the stiffener member to the skin member.

2. The assembly of claim 1 further including a plurality of reinforcing pins disposed through the flange portion of the stiffener member and into the skin member.

3. The assembly of claim 1 further including a plurality of pins disposed through the web portion of the stiffener member.

4. The assembly of claim 1 in which said stiffener member includes two flange portions joined at said radius region.

5. The assembly of claim 4 in which said stiffener member includes two pieces of material, each piece comprising one half of said web portion and each piece terminating in a said flange portion.

6. The assembly of claim 1 in which said stiffener member further includes a noodle region.

7. The assembly of claim 6 in which said assembly further includes a stiffener noodle disposed within said noodle region.

8. The assembly of claim 6 further including a softener layer disposed within said noodle region about the radius region.

9. An improved stiffener reinforced assembly comprising:
   a skin member;
   a stiffener member including a web portion, a flange portion, and a radius region interconnecting the web portion and the flange portion, the flange portion residing on the skin member;
   a plurality of reinforcing pins disposed through the radius region of the stiffener member and into the skin member to secure the stiffener member to the skin member; and
   a plurality of reinforcing pins disposed through the flange portion of the stiffener member and into the skin member.

10. An improved stiffener reinforced assembly comprising:
    a skin member;
    a stiffener member including two pieces of material, each piece comprising one half of a web portion and each piece terminating in a flange portion, and a radius region interconnecting the web portion and the flange portions, the flange portions residing on the skin member; and
    a plurality of reinforcing pins disposed through the radius region of the stiffener member and into the skin member to secure the stiffener member to the skin member.

11. The assembly of claim 10 further including a plurality of reinforcing pins disposed through the flange portions of the stiffener member and into the skin member.

12. The assembly of claim 10 further including a plurality of pins disposed through the web portion of the stiffener member.

* * * * *

UNITED STATES PATENT AND TRADEMARK OFFICE
CERTIFICATE OF CORRECTION

PATENT NO.   : 5,789,061
DATED        : August 4, 1998
INVENTOR(S)  : Campbell et al.

It is certified that error appears in the above-indentified patent and that said Letters Patent is hereby corrected as shown below:

Column 1, line 10, insert the following:

--This invention was made with Government support under Air Force Contract No. F33615-95-C-3218. The Government has certain rights in this invention.--

Signed and Sealed this

Fifteenth Day of December, 1998

Attest:

BRUCE LEHMAN

Attesting Officer

Commissioner of Patents and Trademarks